United States Patent
Mosko et al.

(10) Patent No.: US 10,855,578 B1
(45) Date of Patent: Dec. 1, 2020

(54) ANONYMOUS COMMUNICATIONS NETWORK UTILIZING BRIDGING CONNECTIONS BETWEEN BROADCAST DOMAINS

(71) Applicant: Palo Alto Research Center Incorporated, Palo Alto, CA (US)

(72) Inventors: Marc E. Mosko, Santa Cruz, CA (US); Alejandro E. Brito, Mountain View, CA (US); Hamed Soroush, San Jose, CA (US); Shantanu Rane, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/451,643

(22) Filed: Jun. 25, 2019

(51) Int. Cl.
*H04L 12/46* (2006.01)
*H04L 12/761* (2013.01)
*H04L 12/24* (2006.01)

(52) U.S. Cl.
CPC .............. *H04L 45/16* (2013.01); *H04L 41/12* (2013.01)

(58) Field of Classification Search
CPC . H04L 61/2517; H04L 61/2514; H04L 45/16; H04L 41/12; H04L 12/46
See application file for complete search history.

(56) References Cited

U.S. PATENT DOCUMENTS

| | | | |
|---|---|---|---|
| 6,671,737 B1 | 12/2003 | Snowdon et al. | |
| 7,023,979 B1* | 4/2006 | Wu | H04M 3/5233 379/265.11 |
| 2017/0214620 A1* | 7/2017 | Haleem | H04W 4/70 |
| 2018/0242161 A1 | 8/2018 | Vulgarakis Feljan et al. | |
| 2019/0190885 A1* | 6/2019 | Krug | H04L 61/6063 |

FOREIGN PATENT DOCUMENTS

WO 2014051430 4/2014

\* cited by examiner

*Primary Examiner* — Wei Zhao
(74) *Attorney, Agent, or Firm* — Mueting Raasch Group (57) ABSTRACT

A network is organized into a plurality of broadcast domains. Each broadcast domain includes a plurality of nodes each configured to cause messages to be sent to two or more other of the nodes within the broadcast domain. The broadcast domains are coupled via bridging connections. Each bridging connection couples at least one of the nodes from a first of the broadcast domains to at least one of the nodes of a second of the broadcast domains. The messages are caused to be sent through the plurality of broadcast domains via a subset of the bridging connections. The subset of the bridging connections is selected non-deterministically via the plurality of broadcast domains.

20 Claims, 6 Drawing Sheets

ANONYMOUS COMMUNICATIONS NETWORK UTILIZING BRIDGING CONNECTIONS BETWEEN BROADCAST DOMAINS

SUMMARY

The present disclosure is directed to an anonymous communications network using bridging connections between broadcast domains. In one embodiment, a network is organized into a plurality of broadcast domains. Each broadcast domain includes a plurality of nodes each configured to cause messages to be sent to one or more other of the nodes within the broadcast domain. The broadcast domains are coupled via bridging connections. Each bridging connection couples at least one of the nodes from a first of the broadcast domains to at least one of the nodes of a second of the broadcast domains. The messages are caused to be sent through the plurality of broadcast domains via a subset of the bridging connections. The subset of the bridging connections is selected non-deterministically via the plurality of broadcast domains.

In another embodiment, a message is received at a node within a first broadcast domain. The node is capable of sending the message to at least one peer node within the first broadcast domain and to a known bridging node in a second broadcast domain different than the first broadcast domain. The second broadcast domain has two or more bridging node. The node sends the messages to the at least one peer node so that multiple instances of the message are passed through the first broadcast domain. A hash is performed on the message to determine a subset of the two more bridging nodes of the second broadcast domain that will receive the message. If the known bridging node is in the subset, the message is sent to the known bridging node.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to computer network architecture and node functionality for anonymous communications. Generally, commonly-implemented Internet protocols can provide clues to the identities of individuals. For example, due to the source and destination Internet Protocol (IP) addresses being embedded in many types of message headers, it is possible to determine the Internet gateway where messages originated from and went to. While some measures such as proxies and virtual private network (VPNs) can help obscure the endpoint identities, these measures can still be susceptible to leaking the identity of the endpoints using sophisticated traffic pattern analysis.

Some techniques, such as onion routing (used in Tor networks), utilize protocols intended to allow a message sender to remain anonymous. The message is wrapped in multiple layers of encryption, with identity of the intermediate nodes that pass the message being encrypted in each of the layers so that the intermediate nodes know only the identity of the previous node from which the message was received and the next node to which the message is to be sent. The message can be decrypted by the receiver after leaving the exit node of the network, without the message or its headers having any indication of the source IP address from which the message was sent.

While onion routing can be configured to successfully anonymize message, such networks still have weaknesses that can be exploited to block messages from being sent or by corrupting messages. For example, it may not be assumed that intermediate nodes can be trusted, and so such a node can block messages from being sent, selectively on en masse. In order to counter this, the message can be sent via different routes, however it is still possibly that an attacker may control multiple nodes, thereby stopping or corrupting significant amounts of messages, even if such messages are sent through multiple different routes.

The present disclosure relates to an anonymous communications network with features that prevent interruption of messages due to accidental or intentional interruptions or corruption of messages. The servers that act as intermediate nodes should not discover identity of the sender, and an external adversary performing traffic analysis should not discover the path taken by the message as it travels from the source to an intermediate message server database, and from that database server to the destination. Systems described herein offer these features using mixnets and gossip protocols without incurring their disadvantages, e.g., without needing information about the path on which to route the message, and without flooding the network.

For purposes of explaining the operation of systems described herein, an example scenario is provided. In this scenario, Alice wants to communicate with Bob using a network of servers. The servers should not discover the Alice is communicating with Bob. Moreover, an external adversary performing traffic analysis must not discover the path taken by the message as it travels from Alice to an intermediate message server database, and from that database server to Bob.

The problem is solved using two concepts. First, the system utilizes the concept of mixnets (e.g., as used in Tor networks). In a mixnet, a server at hop M of a message path waits until it receives a specified number of messages from other servers at hop M−1. It then re-orders the messages at random, and transmits and re-randomizes each message from the re-ordered list to a plurality of servers at hop M+1. If the messages are correctly randomized (e.g., via encryption) this has the advantage that an adversarial server cannot determine the source and destination of the message. The adversarial server will only know the server from which it received the message and the server to which it will send the message. Furthermore, a global adversary will not be able to trace the path of the message.

The disadvantage of most mixnet implementations is that they need the sender to know the complete path from the sender to the receiver, or at least from the sender to an intermediate message database server or mailbox, from which the receiver can extract the message. In adversarial and dynamic networks, this information may not be available, may become stale, or may not be usable if one or more servers on the path are compromised.

A second concept utilized by the system is gossip protocols. In gossip protocols, a server at hop M of a message path optionally re-randomizes the message and forwards it to a randomly chosen subset of its neighbors, who are deemed to be at hop M+1. The neighbors do the same, repeatedly, until a significant portion of the servers in the network have received the message. The advantage of this approach is that due to re-randomization and gossip at each stage, each server only again knows about the server from which it received a given message and the server to which it forwarded the message, but does not know the source and eventual destination. In a gossip network, even if malicious servers collaborate, the source and destination's identity is hidden as long as there is one honest server on the path. The disadvantage of gossip protocols is that they flood the network, resulting in inefficient bandwidth utilization.

Figure 1:
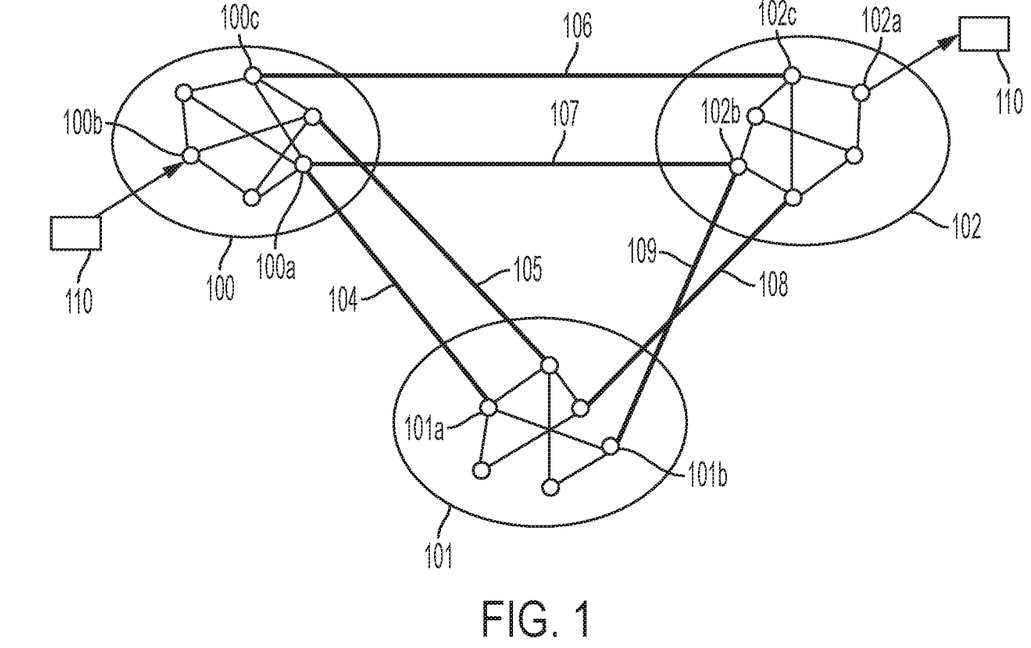
FIG. 1 is a block diagram of a communications system according to an example embodiment.

Networks, systems, and protocols described herein obtain the benefits of mixnets and gossip protocols without incurring their disadvantages, e.g., without needing information about the path on which to route the message, and without flooding the end-to-end network path. In FIG. 1, a block diagram shows a system according to an example. The system includes a network organized into a plurality of broadcast domains 100-102. Each broadcast domain 100-102 each has a plurality of nodes each configured to cause messages to be sent to two or more other of the nodes within the broadcast domain.

The broadcast domains 100-102 are coupled via bridging connections 104-109. Each bridging connection couples at least one of the nodes from a first of the broadcast domains 104-109 to at least one of the nodes of a second of the broadcast domains 104-109. For example, bridging connection 104 couples node 100a of broadcast domain 100 to node 101a of broadcast domain 101. Messages are sent (via the nodes) through the plurality of broadcast domains 100-102 via a subset of the bridging connections 104-109. The subset of the bridging connections 104-109 is selected non-deterministically via the plurality of broadcast domains.

For example, assume a message 110 is to be sent from node 100b in broadcast domain 100 to node 102a in broadcast domain 102. In one instance, the message is protected via a cryptographic operation such that only node 102a can recognize that it is the destination and the message carries only the destination address of "broadcast domain 102." Node 100b broadcasts the message through broadcast domain 100, where it is received by node 100c, which knows it is a bridge to broadcast domain 102. Node 100c will continue to broadcast the message in domain 100 so as not not reveal any special behavior, and will additionally forward the message to node 102c. Node 102c will broadcast the message in domain 102, where eventually node 102a will receive the message and be able to see, via a cryptographic operation, that it is the intended destination. Node 102a would continue to broadcast the message so as to not reveal any special behavior.

In this same scenario, the same message 110 (or a different message) is sent between nodes 100b to 102a, and node 100a also receives the broadcast of the message within domain 100. Node 100a may also be designated as a bridging node, although not to domain 102, but to domain 101. Regardless, the node 100a may still send the message to node 101a via bridging connection 104, assuming that some node within domain 101 can reach domain 102. The message is broadcast in domain 101, wherein node 101b receives it and is selected as a bridging node to another domain, in this case the target domain 102. Node 101b sends the message to node 102c via bridging connection 109, which broadcasts the message within domain 102, where it eventually reaches node 102a.

As will be described herein, the subset of bridging connections can be selected within the broadcast domains 100-102 by a pseudorandom function of the message 110, such as a hash function. For example, in the above example, different messages with different hashes would result different paths being case, e.g., via bridging connection 106 for the first message and via bridging connections 104 and 109 for the second message. Or, these different paths could be taken for the same message. For example, in domain 100, two different hash functions could be used (or a single hash function with two keys), resulting in the two bridging nodes 100a and 100c both being selected to send copies of the same message to other broadcast domains.

In the latter case, each bridging domain may select a level of redundancy N of the bridging connections, where N>1. The subset of bridging connections between two adjacent broadcast domains is selected using N-different hash functions or a hash function with N-keys. If, in this example, domain 101 also has level of redundancy of N=2 as domains 100 presumably does for outgoing messages, then bridging connection 108 and 109 might both be used for the same message.

While the networks described herein may use various forms of cryptography to protect the message and routing information, this disclosure does not describe specific encryption techniques used by the nodes, sender, storage databases, etc. These embodiments may use known approaches to provide message/receiver unlinkability and to protect message data and metadata in transit.

Figure 2:
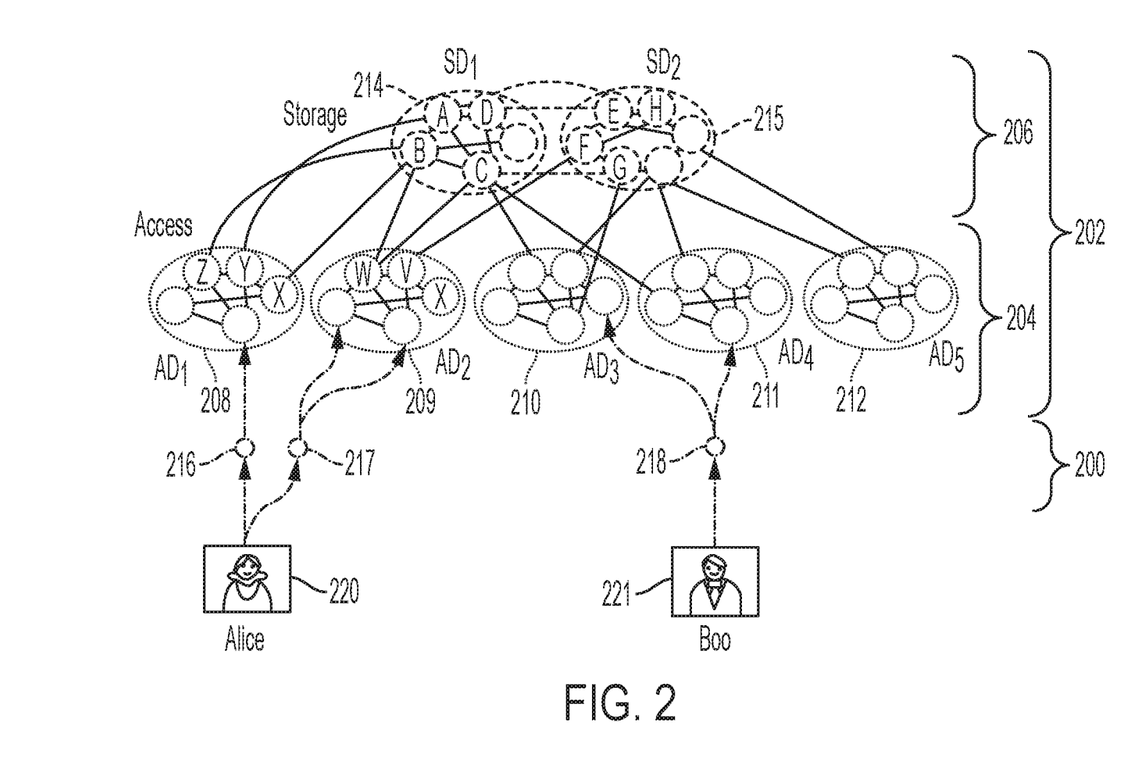
FIG. 2 is a block diagram of a communications system according to another example embodiment.

In FIG. 2, a block diagram illustrates a network according to another example embodiment. The network has a layered structure comprising edge 200 and core 202. The core 202 is comprised of two logical enclaves referred to as access enclave (AE) 204 and storage enclave (SE) 206. An enclave may include a collection of one or more domains as described above, e.g., broadcast domains, gossip domains, etc. The operation of nodes and domains within the enclaves 204, 206 may operate similarly, with the storage enclave 206 managing the storage and retrieval of message data, and the access enclave 204 facilitating communications between the storage enclave 206 and the edge nodes 200. The network illustrated in FIG. 2 depicts a specific specialization of a more general multi-hop organization of broadcast domains. In FIG. 2, there is an implied routing from the gateways in 200 to the access enclave domains 204 to the storage enclave domains 206. The organization of FIG. 2 is a practical realization of a specific application and is not meant to limit the possible organizations.

The access enclave 204 includes access servers arranged in gossip domains 208-212. The storage enclave 206 includes message servers arranged inside gossip domains 214, 215. This arrangement one nodes within the domains may be specified, e.g., in a data file, by a one or more authoritative entities and may be distributed directly and/or via a peer-to-peer protocol. Such data file need not specify all information about all the nodes within a domain, but may include at least some identity information as described below that facilitate inter-domain and intra-domain communications. Below, each architectural layer is described as well as the role each component plays to provide client anonymity.

The edge layer 200 comprises several gateway nodes 216-218 that connect external clients (e.g., Alice 220 and Bob 221) to the core 202. Clients 220, 221 connect to these gateway nodes 216-218 to be able to leverage the capability of anonymous communication. The edge layer 200 ensures minimal but sufficient exposure of core nodes to external, and possibly malicious, clients.

The access enclave 204 and storage enclave 206 of the core layer 202 each enclave comprises one or more gossip domains (GDs). All GD nodes, whether in the storage or access enclave use intelligent flooding to communicate with other nodes in their gossip domain. To facilitate communication between gossip domains, the nodes use a scheme of distributed and redundant bridgehead selection between gossip domains and corresponding enclaves.

Each core server and gateway server takes several steps to reduce the ability of an adversary to perform traffic analysis. Each peer-to-peer link uses encryption between the nodes so messages always appear different on each link. In one embodiment, when a server learns the identity of a peer it also learns that peer's public key so it can perform a secure key exchange, such as Diffie-Hellman Key Exchange and rotate keys based on use. Each server also generates Poisson chaff on a link to reduce timing attacks and speed up operation because it does not need, necessarily, to wait for other multi-hop messages to reorder queues. Chaff only travels a single link and, via the link encryption, is indistinguishable to an outside observer from multi-hop non-chaff messages.

Also, to avoid creating analyzable traffic patterns, all messages are the same length to avoid packet size traffic analysis. A client will fragment a message in to fixed sized chunks and pad out the final chunk. Each chunk includes fragmentation information to enable re-assembly. In some embodiments, the system could use error correcting codes to allow reassembly with only a subset of chunks or from corrupted chunks.

With this approach, e.g., resilient flooding within each gossip domain and redundant, attack-resilient communications between gossip domains and enclaves, the network avoids the pitfalls of attack-resistant routing by restricting flooding in the core 202. This allows the network to scale. The features of the network described in this disclosure are mostly related to the timely and oblivious propagation of messages among core server nodes. This hybrid architecture is flexible, allowing the network to be fine-tuned to meet stringent latency requirements without violating its anonymity and security requirements.

In reference again to FIG. 2, the gateways 216-218 are a limited subset of server nodes that are exposed to clients 220, 221 via discovery. Apart from this difference, their operation is not significantly different from core nodes. The access enclave 204 is made up of several independent gossip domains that independently forward messages towards the storage enclave 206, where the messages are stored until retrieved by the intended recipient. A user injects a message into one or more gateway server 216-218. Each gateway server relays the message to one or more access server, where those servers may be in the same domain (e.g. server 217 relaying to access domain 209) or in different domains (e.g. server 218 relaying to domains 210 and 211). This is shown in FIG. 2, where Alice 220 injects the same message into gateways 216 and 217. From gateway 217, the same message is injected into two nodes of access domain 209. Injecting a message more than once into a single domain helps ensure that the message makes progress around corrupted nodes. If a user injects a message into enough domains and enough times in each domain, the user can expect with good probability that the message will reach the storage enclave 206.

There are several differences between a user sending a message to multiple gateways verses a gateway sending a message to multiple access servers. When a user sends a message to multiple gateways, the user can gain reliability versus corrupted gateways. The cost, however, is that if there is a reply to the message (such as an ACK or a data response), the client will receive it from each gateway increasing the communications cost. When a gateway sends a message to multiple servers in a single access domain (e.g. gateway 217), it also works to avoid corrupted nodes in the access domain and it will receive multiple responses. The overall increase in communications cost is limited, however, because the intelligent flooding in an access domain remains the same even though two or more copies were injected. When a gateway injects message into multiple access domains (e.g. gateway 218), or a client sends a message to multiple gateways connected to different domains (e.g. client 220), then there is a significant increase in communications cost because the message is flooded through multiple access domains.

Intelligent flooding is used within each gossip domain to ensure that communications have a high likelihood of working around adversarial nodes to always make progress. Because flooding has a communications cost, it is restricted to be inside one or more gossip domains within each logical enclave. Domains may be defined to either scope within certain network metrics (e.g., not span the globe in one gossip group) or scope simply on the domain diameter for scale. The number of domains within an enclave will depend on the number of core nodes in the enclave and an estimate of the adversarial server corruption rate. The higher the corruption rate, the more nodes that are needed per domain or the higher the connectivity (node degree) that are needed per domain. Note that increasing the node degree exposes more endpoint IP addresses within the domain.

Within each broadcast domains, the individual nodes have one or more "neighbors," which are peers to which the node can connect, e.g., has both an identifier and an endpoint address. The node sends the messages to one or more neighbors to effect the flooding of the message within the domain. The propagation of the message through the broadcast domain may induce a pattern that can lead to identifying a message path by tracking these patterns through each broadcast domain. Accordingly, within (and between) the broadcast domains, chaff messages are used to cause the network to exhibit a pattern that is less amenable to traffic analysis. Generally, this involves the nodes sending 'meaningless' messages to each other in order to hide the actual traffic being sent over the domains.

To reduce the broadcast overhead of chaff in the gossip domains, a Poisson link chaff model can be used. Each node independently maintains a certain Poisson message rate inside an encrypted link with each one of its neighbors. Each node tags its chaff messages so that its neighbors can easily identify and discard the chaff. In one embodiment, all message transmissions may be forced to be of the same size to further suppress any discernable patterns in message traffic. If a user has a large message, the message will be fragmented into smaller pieces. Only the final recipient will reassemble the message.

To bridge messages between domains, a randomized and redundant bridge selection mechanism is used. All nodes within a domain know the node identifiers of all adjacent nodes within adjacent domains. This inter-domain peer vector is flooded within the domain. For each message, m, flooded in the domain, each node calculates a set of hash functions (either different hash functions or keyed hash functions), $h_1(m), \ldots, h_n(m)$, where the number, n, of hash functions depends on the desired redundancy between domains. These hash functions index into the vector of adjacent inter-domain peers. If the node is a neighbor of one or more of those indexed peers, it will—in addition to the intra-domain flooding—forward m to each of those hash-indexed peers outside of the domain. Because each node calculates the forwarding independently and because the random domain graph is with high probability connected (percolated) despite adversarial nodes, there is high likelihood that m will reach the next domain.

There are several approaches to determine the overall path a message should take through broadcast domains. In the example given in FIG. 2, there is an implied static routing from gateways to access domains to storage domains, then flooded through all storage domains. Another possibility is to use an inter-broadcast domain routing protocol, such as path vectors, link vectors, or distance vectors. Path vectors and distance vectors have the advantage that they reveal less of the network topology as they only need to identify broadcast domains.

Because there are likely multiple bridges to the next domain, this strategy also works around adversarial nodes in the next domain. An appropriate collision-resistant hash function, such as SipHash, can be used along with calculation of the bounds on the number of necessary hashes such that each message makes progress with high probability.

Figure 3:
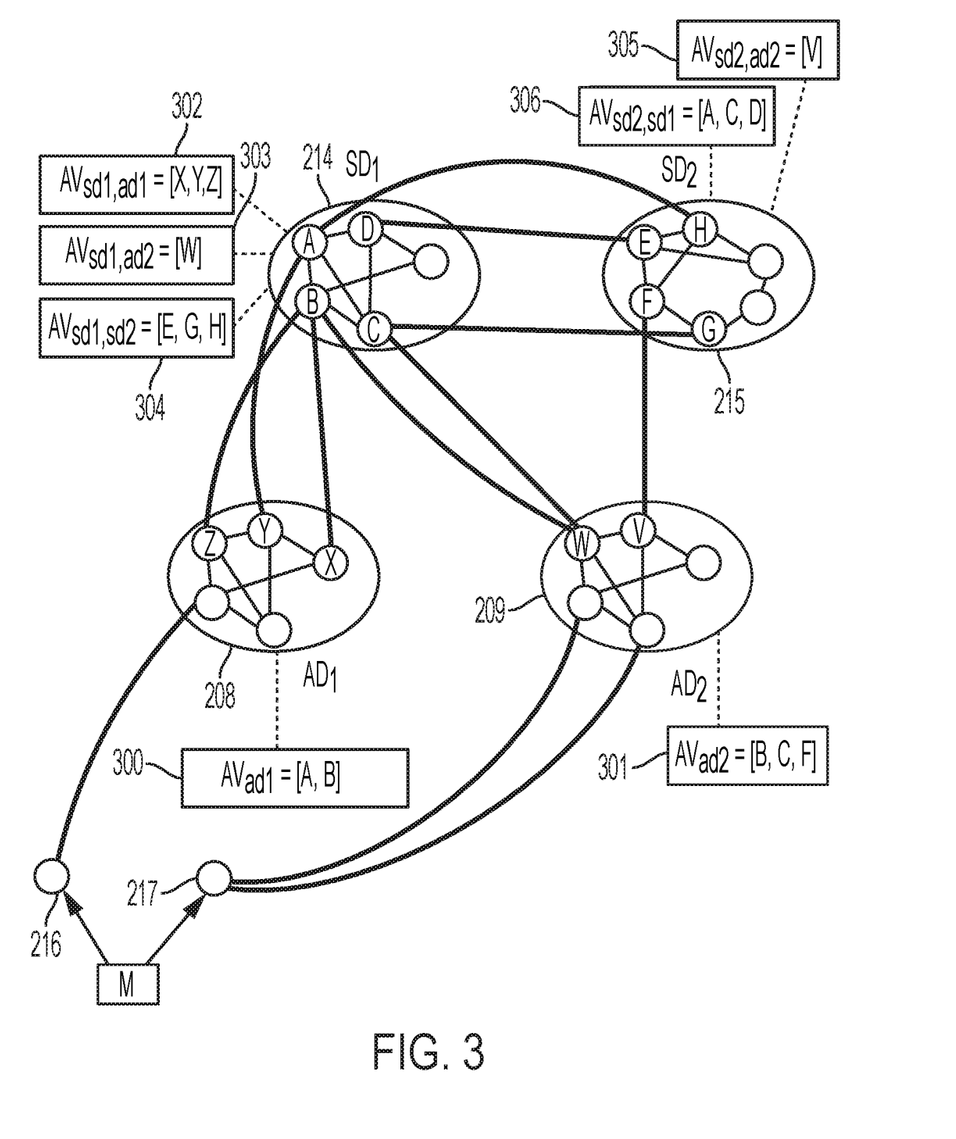
FIG. 3 is a block diagram illustrating operation of bridging nodes according to an example embodiment.

The specific adjacency vectors used in FIG. 3 are an effect of the implicit routing used in FIG. 2. Access domains 208 and 209 only route into the storage enclave, which will flood over all storage domains, so it is not important to distinguish which neighbors are in which storage domains. Storage domains mush route to other storage domains and also back to specific access domains to send an ACK or a data response. Thus, storage domains need to keep track of multiple adjacency vectors to enable these types of message flows. Access domains use a special type of reverse path forwarding, described below, to send data back to gateways, so no adjacency vector exists for access domains to gateways. If a network uses a more general topology than FIG. 2 or uses different routing strategies than the implicit FIG. 2 strategy, then the network would need to track different adjacency vectors.

A users/client's app includes a nonce in each message that it sends out for a recipient. Each (encrypted) message will be hashed into different values, thereby effectively routed over different elected bridgeheads. Furthermore, the app may send the same end-to-end message several times with different nonces, causing the message to use different bridges. The receiver, who decrypts the messages, would see that they are duplicates and discard any extras. This approach provides the system with a high degree of resilience against corrupted nodes and denial-of-service attacks on the core 202.

In FIG. 3, a block diagram illustrates a randomized bridge selection mechanism according to an example embodiment. This example shows bridging between access domains 208, 209 and storage domains from 214 and 215 FIG. 2. For simplicity, two hash functions, $h_1$ and $h_2$, are used. Nodes X, Y, Z in access domain 208 are adjacent to nodes A and B in storage domain 214. Similarly, access domain 209 has nodes W, V adjacent to nodes B, C in storage domain 214 and node F in storage domain 215.

Each access domain constructs is adjacency vector for all adjacent storage domain nodes. In FIG. 3, access domains 208, 209 are shown having respective adjacency vectors 300, 301. Each storage domain keeps an adjacency vector per access domain and per other storage domains. Thus, storage domain 214 keeps adjacency vectors 302, 303 for respective access domains 208, 209, as well as adjacency vector 304 for storage domain 215. Storage domain 215 keeps adjacency vector 305 for access domain 209 and adjacency vector 306 for storage domain 214.

Alice inserts her message, M, via a set of discovered gateways 216 and 217. Gateway 216 will insert one copy of the message to access domain AD1 (208) and gateway 217 will insert two copies into AD 2 (209). Inserting the message twice into AD2 causes no additional flooding overhead as the intelligent flooding will only forward one copy per server. In access domain 208, the access vector has length 2, so each node with an adjacency to the storage domain will calculate h1(M) modulo 2 and h2(M) modulo 2. The result will be a pseudo-random distribution of access vector indices 0 or 1. The results will be one of (00, 01, 10, 11). In the case 00 and 11, the same adjacency node, A or B respectively, is chosen. In the 01 and 10 cases, both A and B are chosen. If a node calculating the hashes is adjacent to one of the chosen nodes, it forwards the message to that neighbor. In access domain 209, the access vector is length 3, so each node with an adjacency will calculate h1(M) modulo 3 and h2(M) modulo 3 with a result of indices (00, 01, 02, 10, 11, 12, 20, 21, 22) and proceeds similarly to access domain 208. If, for example, the result is 22, then only node F is selected and only node V will forward the message into the storage enclave.

A server in an access domain that receives a message from a gateway is called an ingress server. If a message is sent via multiple copies into the same domain, there may be multiple ingress servers in that domain. An ingress server will append certain information to the message to enable a response to come back to it so it can forward the message back to the gateway server and thus back to the client. An ingress node will append the tuple {DomainId, Nonce} and encrypt it for the storage enclave. The DomainId identifies the ingress access layer domain in which the ingress server resides. The nonce is an ingress-server specific identifier that allows it to demultiplex messages back to the client. When a server in the storage domain wants to send a response, it enciphers the message, M', for the client and floods it in the storage domain with a destination of {DomainID, Nonce}. The message is flooded through the entire storage enclave, in this case SD1 and SD2. Using the same hash-based bridging algorithm, each node in the storage enclave with an adjacency to DomainId calculates h1(M') and h2(M') modulo the adjacency vector length. In FIG. 3, if the DomainId is, for example, AD2, then the response would be sent back to both W and V because each storage domain has a vector length of 1. When electing a bridge node, the election uses the adjacency vector for the destination domain. It may be that no node in a given storage domain has an adjacency to that access domain, but that does not cause a problem as the response is flooded over the storage layer and it will eventually find a node that has an adjacency and elects to bridge the message.

When a response is flooded in an access domain, each node with an adjacency to a gateway compares the {DomaiNId, Nonce} to its DomainId and stored nonces. If the message matches a stored value, the server was the ingress server for the original message so it will forward M' to the corresponding gateway in addition to continuing to flood the message in the access domain. To return a message from the storage layer to a client, a storage server uses the embedded DomainId and Nonce added by the ingress node.

The concept of an ingress server is not limited to the network structure of FIG. 2. Any server in a broadcast domain that receives a request message from a different broadcast domain may function as an ingress server. It caches the reverse path of the request and adds it's {DomainId, Nonce} tag to the request. If the request already has a previous {DomainId, Nonce} tag, the new ingress server stores that previous tag with the cached data and replaces it with its own tag before forwarding the request. This tag switching process may be repeated many times through multiple broadcast domains. A response may follow any path to the DomainId in the response's tag, it is not that the response exactly follows a reverse path. When a response arrives at the ingress server in DomainId, that server swaps tags, continues flooding the response, and forwards the response along the cached reverse path. This process functions much like Network Address Translation (NAT) in an IP network that replaces the source IP and port address. It will cause the response to travel to the NAT point at which time the prior addresses are swapped in and the response continues traveling towards the original source.

The gossip domains have features that can ensure resilience. Within a gossip domain, it is known from the theory of random graphs that to have a connected component, the probability of an edge must be larger than ln(n)/n. For 50 nodes, for example, p>0.078, which means the average node degree will be k>3.9. For the gossip domain to be resilient against corrupted or failing nodes, there is a result for Erdös-Rényi graphs indicating that there is a percolation threshold to maintain one giant component of a graph with average node degree k. The percolation threshold is p=1/k.

The gossip domains can be constructed such that randomized broadcast within a gossip domain is time efficient. It can be shown that on a general graph, it only takes 1.5 log 2(n) rounds until all nodes have the message. When servers in the core come from home volunteer computers, it is likely they only have one uplink to the Internet. In that case, a round-based protocol will closely model how nodes unicast a "broadcast," one link at a time. A round might be, for example, 200 ms, so in a domain of 50 nodes it would take approximately 1700 ms for all nodes to terminate. Because of the distributed hash-based bridging used to move a message from one domain to another, a message will very likely exit a domain long before the termination of the flooding. Nonetheless, this bound can be used as an upper limit for a message to exit a domain. Using a round-based broadcast algorithm couples well with interleaving buffered messages and adding chaff.

As noted above, the nodes within the network can utilize Poisson chaff to hide traffic patterns. Domains could be constructed randomly or based on a network metric, such as node-to-node latency. A preferred construction method for domains is to use randomized clusters of nodes with similar node-to-node latency and use sparse yet redundant inter-domain bridging over the longer-haul links. At the storage enclave 206, in particular, because a message must flood between all domains, those domains should be constructed such that they coarsely correspond to well-connected peers.

The clustering scheme, for example, might end up making seven clusters along continental bounds. If the clusters are built in this way, for example, cluster-to-cluster latencies may be around between 70 ms (trans-Atlantic) to 150 ms (Europe to Asia) and within-cluster latencies between 10 ms (Japan) to 140 ms (Latin America). If a broadcast round of 200 ms is used, then as above the termination time within a domain is approximately 1.7 s. For seven storage clusters of 50 nodes in a partial mesh with diameter 2, it would take 1.7 s to clear the access enclave 204 plus 2×1.7 s to clear the storage enclave, for a total flooding time of 5.1 s.

The gossip domains can be made resilient against Denial of Service (DoS) attacks using rate limiting. Because intelligent flooding is used within each gossip domain, there is the potential for a corrupted node to inject more and more traffic and thus try to DoS the domain. To combat this attack, the first node in the access enclave 204 can receive a message from a client who has signed the message in a way that can be verified by other access enclave and storage enclave nodes. This approach allows all nodes to keep message rate statistics per signing node and possibly "rate limit by ingress node" those that seem to be generating too much traffic. So long as honest clients inject their messages into more. than one ingress node, the messages should flood correctly and without rate limit unless all their ingress servers are being rate limited.

The systems described herein utilize statistical rate limiting. Each node in an access domain keeps track, per ingress node as identified by its signature, of the packet rate over time. If all end-users behave correctly and all access nodes behave correctly, the ingress load should be spread evenly and all ingress nodes should have a similar message rate.

Domain nodes can rate limit any source whose input rate exceeds a threshold (such as 1-standard deviation over the mean) in proportion to that excess. There are two potential attacks. First, a corrupt user could send an excess of traffic to a good ingress node, thus rate limiting it. Second, a corrupt ingress node could drop messages and try to influence the mean down. This architecture reduces the impact of a corrupt client trying to rate limit an honest node by having honest clients send their messages to multiple ingress nodes, so unless a client can flood all the ingress nodes, typically a client's messages will not be rate limited.

Figure 4:
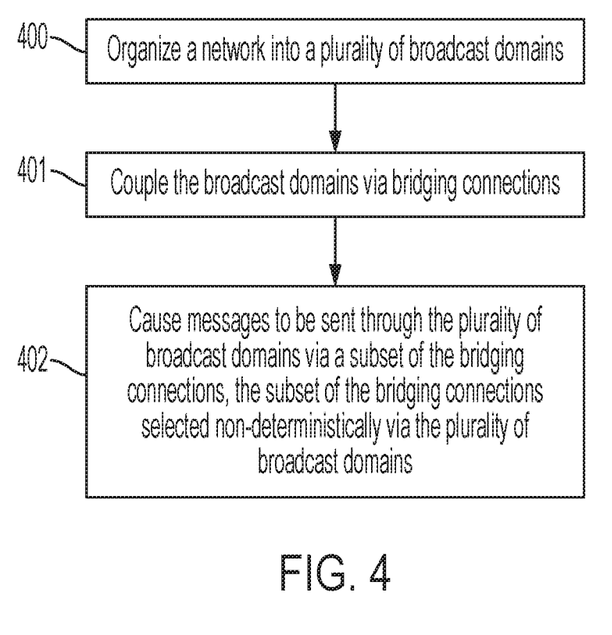
FIGS. 4 and 5 are flowcharts of methods according to example embodiments.

In FIG. 4, a flowchart shows a method according to an example embodiment. The method involves organizing 400 a network into a plurality of broadcast domains. Each broadcast domain includes a plurality of nodes each configured to cause messages to be sent to one or more other of the nodes within the broadcast domain. The broadcast domains are coupled 401 via bridging connections. Each bridging connection couples at least one of the nodes from a first of the broadcast domains to at least one of the nodes of a second of the broadcast domains. The messages are sent 402 through the plurality of broadcast domains via a subset of the bridging connections. The subset of the bridging connections are selected non-deterministically via the plurality of broadcast domains.

Figure 5:
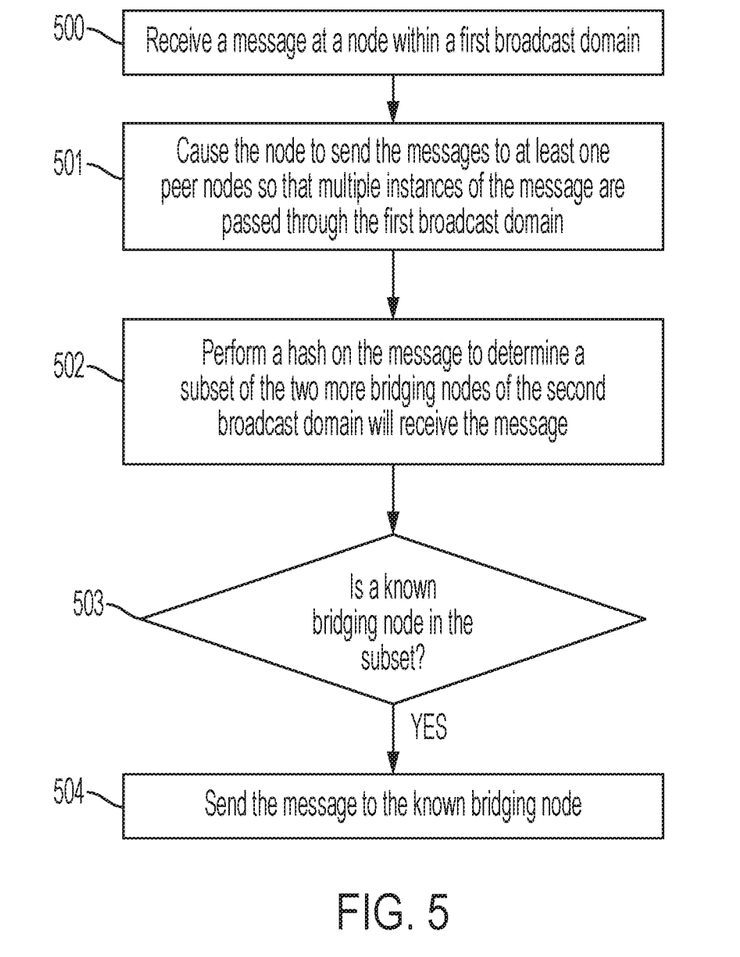

In FIG. 5, a flowchart shows a method according to another example embodiment. The method involves receiving 500 a message at a node within a first broadcast domain. The node is capable of sending the message at least one peer node within the first broadcast domain and to a known bridging node in a second broadcast domain different than the first broadcast domain. The second broadcast domain has two or more bridging nodes. The node sends 501 the messages to the at least one peer node so that multiple instances of the message are passed through the first broadcast domain. A hash is performed 502 on the message to determine a subset of the two more bridging nodes of the second broadcast domain will receive the message. If it is determined 503 that the known bridging node is in the subset, the node sends 504 the message to the known bridging node.

Figure 6:
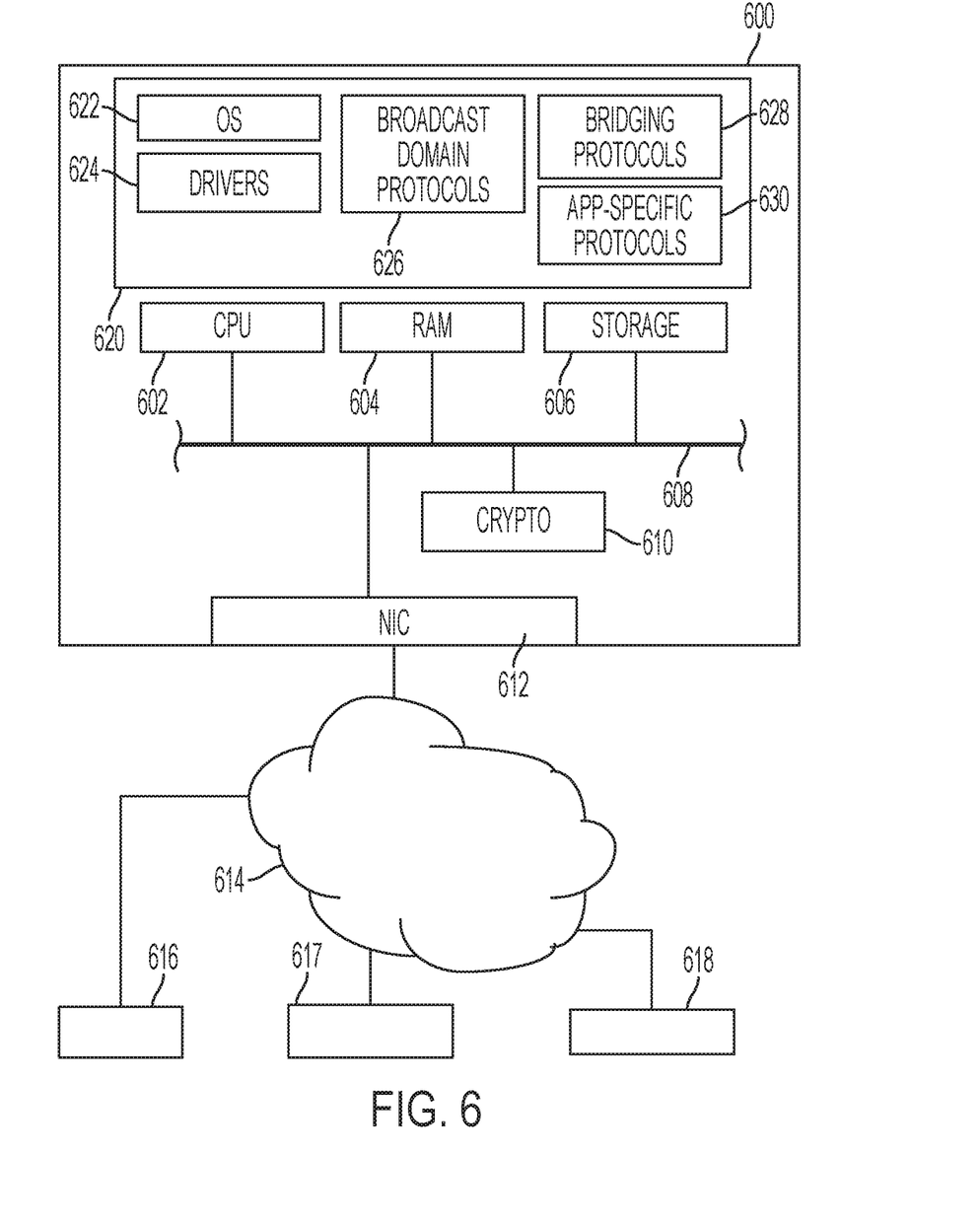
FIG. 6 is a block diagram of an apparatus according to an example embodiment.

Generally, the networks and systems described herein can be implemented using conventional or custom processing hardware, e.g., personal computers, servers, routers, gateways, embedded devices, application-specific integrated circuits, etc. In FIG. 6, a block diagram shows an apparatus 600 according to an example embodiment that can be used as a computing node in any of the embodiments described above. The apparatus 600 includes one or more processors 602 such as a central processing unit, co-processor, graphics processing unit, tensor processing unit, etc. The processor 602 is coupled to memory, which may include both random access memory 604 and persistent storage 606, via one or more input/output busses 608. Other general-purpose or special-purpose hardware may be coupled to the bus 608, such as cryptographic module 610 and network interface 612.

The network interface 612 facilitates communications via a network 614 with other computing nodes 616-618. The network 614 may include a combination of local area links and wide area communications backbones. The computing nodes 600, 616-618 may communicate using any number of compatible protocols. The apparatus 600 includes store software 620 that facilitates communications as described herein.

The software 620 includes an operating system 622 and drivers 624 that facilitate communications between user level programs and the hardware, as well as managing at least some layers of the network communications protocols. The software 620 may include specialized software components, such as a broadcast domain protocol module 626 that facilitates inter-domain communications, e.g., using gossip protocols. The apparatus 600 may be configured as a bridging node, in which case a bridging protocol module 628 may be used. Other application specific functionality may be provided, as indicated by module 630. For example, the operation of module 630 may be different based on whether the apparatus is operating as a storage domain node, access domain node, gateway, etc.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method, comprising:
   organizing a network into a plurality of broadcast domains, each broadcast domain comprising a plurality of nodes each configured to cause messages to be sent to one or more other of the nodes within the broadcast domain;
   coupling the broadcast domains via bridging connections, each bridging connection coupling at least one of the nodes from a first of the broadcast domains to at least one of the nodes of a second of the broadcast domains; and
   causing the messages to be sent through the plurality of broadcast domains via a subset of the bridging connections, the subset of the bridging connections selected non-deterministically via the plurality of broadcast domains.

2. The method of claim 1, wherein the subset of bridging connections are selected by each of the broadcast domain by a hash of the message.

3. The method of claim 2, wherein a level of redundancy of the bridging connections is n>1, and wherein the subset of bridging connections between two adjacent broadcast domains is selected using n-different hash functions or a hash function with n-keys.

4. The method of claim 1, wherein each of the plurality of nodes sends chaff messages to the one or other of the nodes.

5. The method of claim 1, wherein the nodes of the bridging connections send chaff messages to each other.

6. The method of claim 1, wherein the plurality of broadcast domains comprise access domains and storage domains, wherein the messages are received via ingress nodes of the access domains and stored within nodes of the storage domains.

7. The method of claim 1, wherein each ingress nodes attaches to an ingress message an identifier of the ingress node's access domain and a nonce that uniquely identifies the ingress nodes.

8. The method of claim 7, further comprising:
   receiving a request message at a second ingress server in a second domain of the broadcast domains, the request message tagged with a first domain identifier and a first nonce from a first domain of the broadcast domains;
   replacing, in the request message, the first domain identifier and the first nonce with a second domain identifier and a second nonce, and caching the first domain identifier and the first nonce;
   receiving at the second ingress server a response to the request, the response having the second identifier and the second nonce;
   replacing, in the response message, the second domain identifier and the second nonce with the first domain identifier and the first nonce; and
   sending the response message to the first domain.

9. The method of claim 7, further comprising:
   receiving the ingress message at a destination node, and in response, preparing a response message;
   copying the identifier and the nonce to the response message to facilitate the response message returning to the last ingress node of the request messag; and
   flooding the response message into the destination node's broadcast domain.

10. The method of claim 1, wherein each of the plurality of nodes uses a broadcast dissemination protocol that eliminates duplicate messages.

11. A method comprising:
    receiving a message at a node within a first broadcast domain, the node configured to send the message at least one peer node within the first broadcast domain and to a known bridging node in a second broadcast domain different than the first broadcast domain, the second broadcast domain having two or more bridging nodes;

causing the node to send the messages to the at least one peer node so that multiple instances of the message are passed through the first broadcast domain;

performing a pseudorandom function on the message to determine a subset of the two more bridging nodes of the second broadcast domain that will receive the message; and based on the known bridging node being in the subset, sending the message to the known bridging node.

12. The method of claim 11, wherein the pseudorandom function comprises a hash of the message.

13. The method of claim 12, wherein a level of redundancy of the bridging the first and second broadcast domains is n>1, and wherein the subset of the two or more bridging nodes is selected using n-different hash functions or a hash function with N-keys.

14. The method of claim 11, wherein the node and the at least one peer node uses a broadcast dissemination protocol that eliminates duplicate messages.

15. The method of claim 11, further comprising sending chaff messages from the node and the at least one peer node before and after sending the message to the at least one peer node.

16. The method of claim 11, further comprising sending chaff messages from the node to the known bridging node whether or not the known bridging node is in the subset.

17. An apparatus, comprising:
a network interface configured to communicate with at least one peer node within a first broadcast domain and with a known bridging node in a second broadcast domain different than the first broadcast domain, the second broadcast domain having two or more bridging nodes; and
a processor coupled to the network interface and configured to:
receive a message within the first broadcast domain;
send the messages to the at least one peer node so that multiple instances of the message are passed through the first broadcast domain;
perform a pseudorandom function on the message to determine a subset of the two more bridging nodes of the second broadcast domain that will receive the message; and
based on the known bridging node being in the subset, send the message to the known bridging node.

18. The apparatus of claim 17, wherein the pseudorandom function comprises a hash of the message and a level of redundancy of the bridging the first and second broadcast domains is n>1, and wherein the subset of the two or more bridging nodes is selected using n-different hash functions or a hash function with N-keys.

19. The apparatus of claim 17, wherein the apparatus and the at least one peer node uses a broadcast dissemination protocol that eliminates duplicate messages.

20. The apparatus of claim 17, wherein the processor is further configured to send chaff messages before and after sending the message to the at least one peer node.

* * * * *